(12) United States Patent
Walker

(10) Patent No.: US 10,883,542 B2
(45) Date of Patent: Jan. 5, 2021

(54) CYLINDRICAL ROLLER BEARING CONTAINING A CROWNED INNER RING SHOULDER

(71) Applicant: UNITED TECHNOLOGIES CORPORATION, Farmington, CT (US)

(72) Inventor: Brady Walker, Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 16/418,030

(22) Filed: May 21, 2019

(65) Prior Publication Data

US 2020/0370601 A1 Nov. 26, 2020

(51) Int. Cl.
*F16C 19/22* (2006.01)
*F16C 19/26* (2006.01)
*F16C 33/58* (2006.01)

(52) U.S. Cl.
CPC .......... *F16C 33/583* (2013.01); *F16C 19/225* (2013.01); *F16C 19/26* (2013.01); *F16C 33/585* (2013.01); *F16C 2240/50* (2013.01); *F16C 2360/23* (2013.01)

(58) Field of Classification Search
CPC ...... F16C 19/26; F16C 19/225; F16C 33/583; F16C 33/585; F16C 2240/30; F16C 2240/50; F16C 2360/23; F16C 2240/70
USPC ................ 384/564–565, 568, 569, 583, 903
See application file for complete search history.

(56) References Cited

U.S. PATENT DOCUMENTS

| | | | |
|---|---|---|---|
| 3,963,285 A * | 6/1976 | Kellstrom | F16C 19/26 384/450 |
| 4,027,930 A * | 6/1977 | Bodensieck | F16C 19/26 384/556 |
| 4,208,078 A * | 6/1980 | Miki | F16C 33/4635 29/898.061 |
| 4,318,574 A * | 3/1982 | Nakamura | F16C 19/26 384/564 |
| 6,530,693 B1 * | 3/2003 | Ijuin | F16C 19/225 384/450 |
| 6,682,226 B2 | 1/2004 | Kotzalas et al. | |
| 7,416,346 B2 * | 8/2008 | Takemura | F16C 19/225 384/450 |
| 7,874,737 B2 | 1/2011 | Matsuyama et al. | |
| 8,033,737 B2 * | 10/2011 | De Mul | F16C 19/225 384/564 |
| 8,292,511 B2 | 10/2012 | Gibbons | |

(Continued)

FOREIGN PATENT DOCUMENTS

| | | | | |
|---|---|---|---|---|
| CN | 103047275 A * | 4/2013 | | F16C 33/363 |
| CN | 105987076 A * | 10/2016 | | F16C 33/6681 |

(Continued)

*Primary Examiner* — Marcus Charles
(74) *Attorney, Agent, or Firm* — Snell & Wilmer LLP

(57) ABSTRACT

A ring for use in a roller bearing includes an outer wall. The ring further includes two side walls extending away from the outer wall, defining a cavity therebetween for receiving at least one roller, and each of the two side walls having an outer edge at a location facing the cavity and farthest from the outer wall. The ring further includes a curved crown extending inward from at least one of the two side walls and configured to contact the at least one roller to reduce wear of the outer edge.

20 Claims, 3 Drawing Sheets

(56) References Cited

U.S. PATENT DOCUMENTS

| | | | |
|---|---|---|---|
| 8,398,312 B2 | 3/2013 | Fujiwara | |
| 8,469,599 B2 * | 6/2013 | De Mul | F16C 19/225 |
| | | | 384/565 |
| 8,414,194 B2 | 9/2013 | Ito | |
| 8,616,777 B1 * | 12/2013 | Smith | F16C 33/6677 |
| | | | 384/475 |
| 8,858,088 B2 | 10/2014 | Fujiwara | |
| 9,683,605 B2 * | 6/2017 | Murata | F16C 33/6651 |
| 9,958,005 B2 | 5/2018 | Manabe et al. | |
| 10,196,981 B2 | 2/2019 | Ashmore et al. | |
| 10,428,870 B2 * | 10/2019 | Ai | F16C 19/225 |
| 2016/0281779 A1 * | 9/2016 | Saadi | F01D 25/18 |
| 2017/0089218 A1 * | 3/2017 | Hasting | F02C 7/36 |
| 2019/0040905 A1 * | 2/2019 | Ai | F16C 33/583 |

FOREIGN PATENT DOCUMENTS

| | | | | |
|---|---|---|---|---|
| WO | WO-9615384 A1 * | 5/1996 | | F16D 3/2055 |
| WO | WO-2011104150 A1 * | 9/2011 | | F16C 33/6614 |
| WO | WO-2018017352 A1 * | 1/2018 | | F16C 19/225 |

* cited by examiner

CYLINDRICAL ROLLER BEARING CONTAINING A CROWNED INNER RING SHOULDER

FIELD

The present disclosure relates generally to gas turbine engines and, more particularly, to roller bearings for use in a gas turbine engine.

BACKGROUND

Gas turbine engines include various rotating components such as shafts, rotors, fans, and the like. In various situations, it may be desirable to couple components together in such a way as to allow relative rotation of the components. In that regard, a roller bearing may be used as the coupling feature. The roller bearing may include an inner ring coupled to a first component, and outer ring coupled to a second component, and rollers located between the inner ring and the outer ring that allow relative rotation between the inner ring and the outer ring. One or both of the inner ring or the outer ring may include side walls that define a cavity for receiving the rollers. The side walls may have an outer edge that contacts the rollers. Contact between the outer edge and the rollers may undesirably cause wear of the outer edge of the sidewalls.

SUMMARY

Described herein is a ring for use in a roller bearing. The ring includes an outer wall. The ring further includes two side walls extending away from the outer wall, defining a cavity therebetween for receiving at least one roller, and each of the two side walls having an outer edge at a location facing the cavity and farthest from the outer wall. The ring further includes a curved crown extending inward from at least one of the two side walls and configured to contact the at least one roller to reduce wear of the outer edge.

In any of the foregoing embodiments, the curved crown comprises a portion of a circle having a radius.

In any of the foregoing embodiments, the radius is between 0.001 inches and 1,000 inches.

In any of the foregoing embodiments, the ring is an inner ring configured to be paired with a cage, an outer ring, and the at least one roller to form the roller bearing.

In any of the foregoing embodiments, the ring is configured for use in a gas turbine engine.

In any of the foregoing embodiments, the inner ring is configured to rotate at a rotor speed of a rotor of the gas turbine engine, and the at least one roller is configured to rotate at a roller speed that is less than the rotor speed.

In any of the foregoing embodiments, the ring comprises a steel.

In any of the foregoing embodiments, the curved crown includes two curved crowns each extending inward from a respective one of the two side walls.

Also disclosed is an inner ring for use in a roller bearing. The inner ring includes an outer wall surrounding an axis. The inner ring further includes two side walls extending away from the outer wall in a direction away from the axis, defining a cavity therebetween for receiving at least one roller, and each of the two side walls having an outer edge at a location facing the cavity and farthest from the outer wall. The inner ring further includes a curved crown extending inward from at least one of the two side walls and configured to contact the at least one roller to reduce wear of the outer edge.

In any of the foregoing embodiments, the curved crown comprises a portion of a circle having a radius.

In any of the foregoing embodiments, the radius is between 0.001 inches and 1,000 inches.

In any of the foregoing embodiments, the inner ring is configured to be paired with a cage, an outer ring, and the at least one roller to form the roller bearing.

In any of the foregoing embodiments, the inner ring is configured for use in a gas turbine engine.

In any of the foregoing embodiments, the inner ring is configured to rotate at a rotor speed of a rotor of the gas turbine engine, and the at least one roller is configured to rotate at a roller speed that is less than the rotor speed.

In any of the foregoing embodiments, the inner ring comprises a steel.

In any of the foregoing embodiments, the curved crown includes two curved crowns each extending inward from a respective one of the two side walls.

Also disclosed is a roller bearing. The roller bearing includes at least one roller. The roller bearing further includes an outer ring surrounding an axis. The roller bearing further includes an inner ring surrounding the axis, located radially inward from the outer ring. The entering includes an outer wall. The inner ring further includes two side walls extending away from the outer wall, defining a cavity therebetween for receiving at least one roller, and each of the two side walls having an outer edge at a location facing the cavity and farthest from the outer wall. The inner ring further includes a curved crown extending inward from at least one of the two side walls and configured to contact the at least one roller to reduce wear of the outer edge. The roller bearing further includes a cage configured to house the at least one roller between the outer ring and the inner ring.

In any of the foregoing embodiments, the curved crown comprises a portion of a circle having a radius between 0.001 inches and 1,000 inches.

In any of the foregoing embodiments, the roller bearing is configured for use in a gas turbine engine, the inner ring is configured to rotate at a rotor speed of a rotor of the gas turbine engine, and the at least one roller is configured to rotate at a roller speed that is less than the rotor speed.

In any of the foregoing embodiments, the curved crown includes two curved crowns each extending inward from a respective one of the two side walls.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
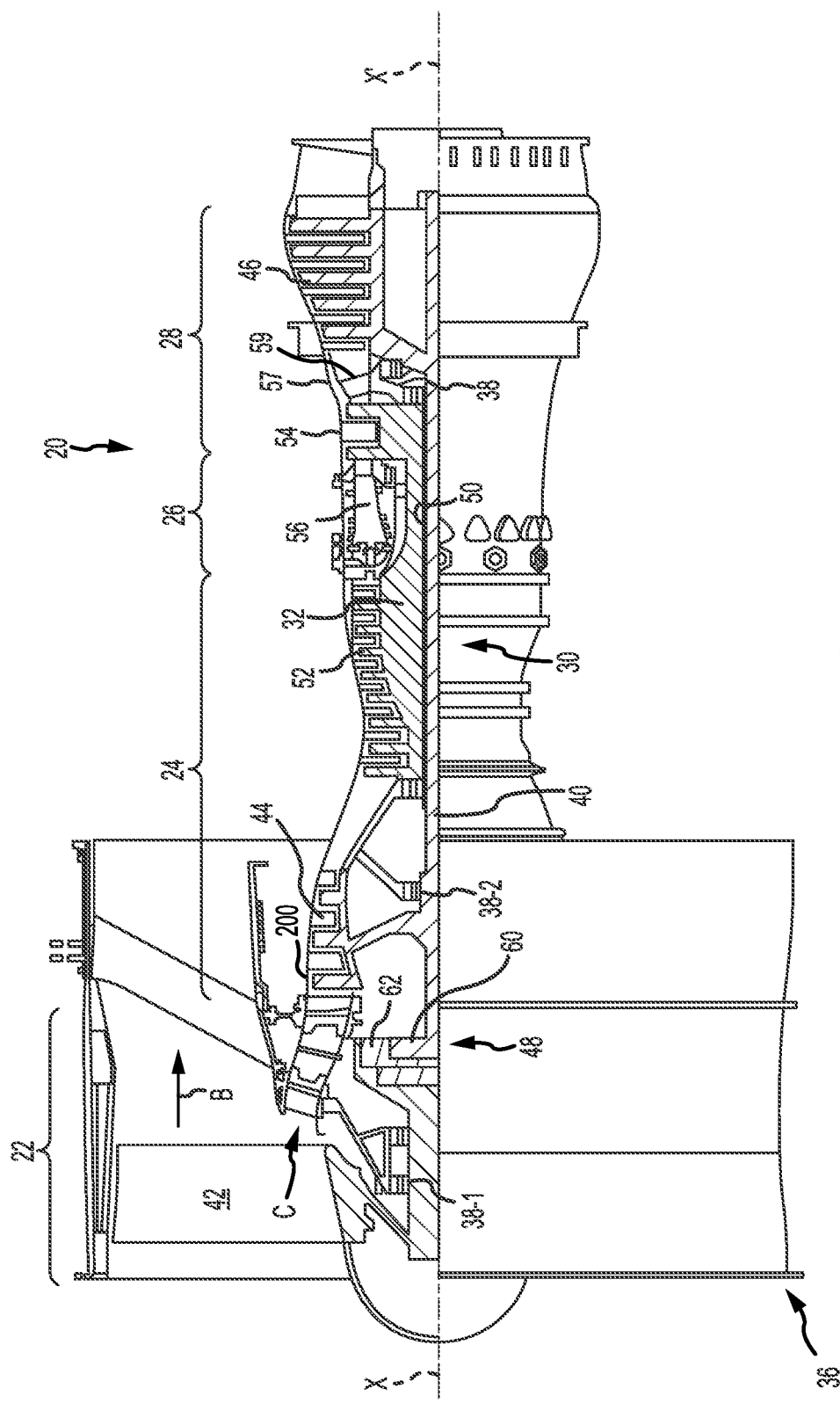
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
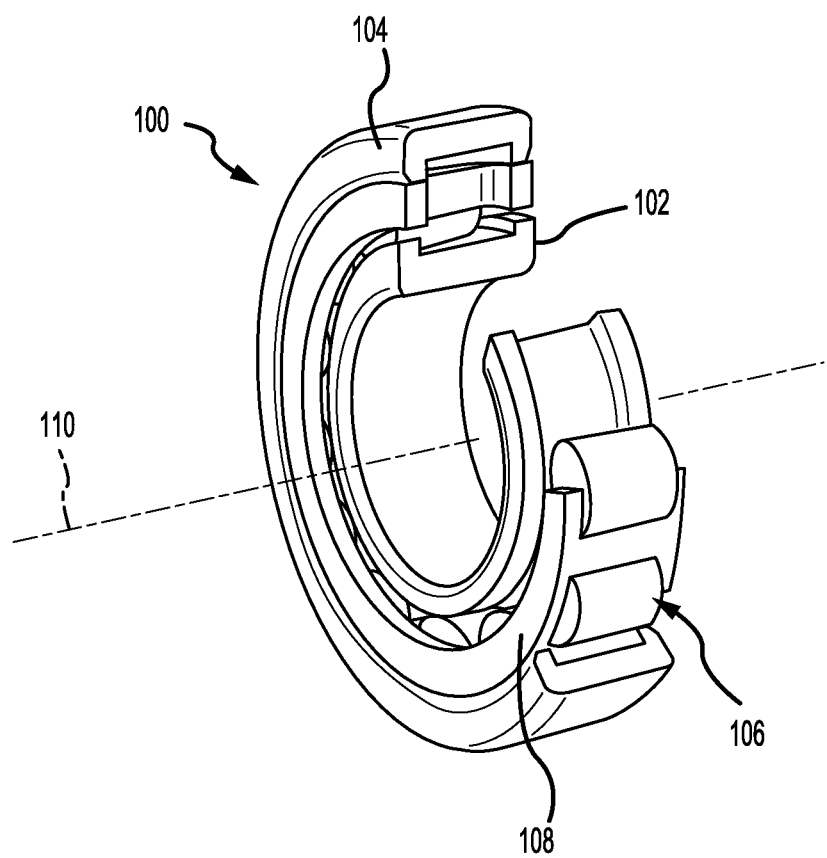
FIG. 2 illustrates a roller bearing with a crowned shoulder, in accordance with various embodiments.

In various embodiments and referring to FIGS. 1 and 2, the gas turbine engine 20 may include one or more roller bearing 100. The roller bearing 100 may include an inner ring 102, and outer ring 104, at least one roller 106, and a cage 108. The inner ring 102, the outer ring 104, and the cage 108 may surround an axis 110, such as the axis X-X' of FIG. 1. The inner ring 102 may be coupled to a first rotating component (such as a rotor, the inner shaft 40, or the outer shaft 50), and may rotate along with the first rotating component. The outer ring 104 may be coupled to a stationary component (such as a case) or to a second rotating component that is rotating at a radial velocity that is different than that of the first rotating component. The at least one roller 106 may facilitate rotation of the outer ring 104 relative to the inner ring 102. The cage 108 may at least partially house the at least one roller 106 and may resist separation of the at least one roller 106 from the other components of the roller bearing 100.

Figure 3:
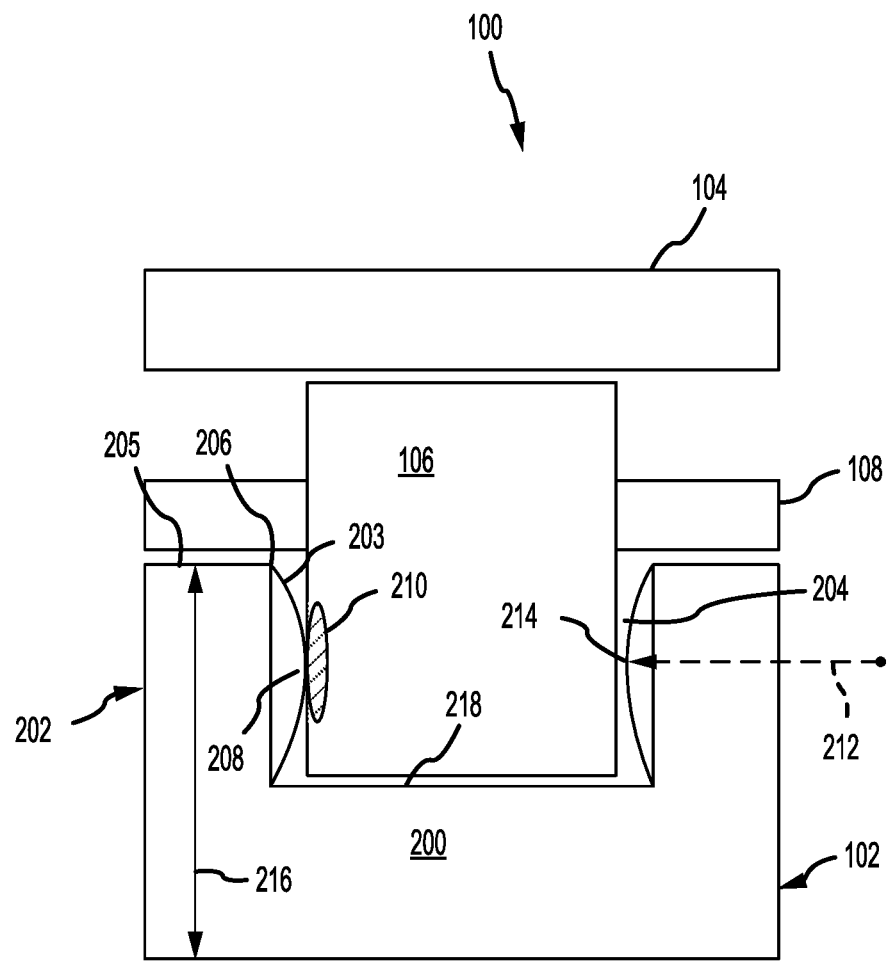
FIG. 3 illustrates a cross-sectional view of the roller bearing of FIG. 2, in accordance with various embodiments.

Turning now to FIG. 3, additional details of the roller bearing 100 are shown. As shown, the at least one roller 106 is retained in place by the cage 108 and housed between the inner ring 102 and the outer ring 104.

The inner ring 102 includes an outer wall 200 and two side walls 202, or shoulders 202, that extend towards the outer ring 104 from the outer wall 200 and, thus, extend away from the outer wall 200 and the axis 110. The outer wall 200 and the two side walls 202 may define a cavity 204 therebetween that receives the at least one roller 106. The outer wall 200 may define an inner ring raceway 218 on which the at least one roller 106 makes contact.

The side walls 202 may have an outer edge 206 that faces the cavity 204 and is located on the side walls 202 at a location farthest from the outer wall 200. For example, the outer edge 206 may be located at an intersection of an axially-extending surface 205 and a radially-extending surface 203. Contact between the at least one roller 106 and the outer edge 206 may cause undesirable stress at the outer edge 206, which may undesirably result in wear of the inner ring 102 at the outer edge 206. Such contact may result from a flat inner face of the two side walls 202 contacting the at least one roller 106.

In order to reduce contact between the outer edge 206 and the at least one roller 106, the roller bearing 100 may include a curved crown 208 extending inward (i.e., towards the at least one roller 106) from at least one of the two side walls 202. In various embodiments, the roller bearing 100 may include a curved crown 208 extending inward from each of the two side walls 202. The curved crown 208 may be formed monolithically with the side walls 202 or may be formed separately and later coupled to the side walls 202.

The curved crown 208 may have a shape that resembles or comprises a portion of a circle and may have a radius 212. In various embodiments, the radius 212 may be between 0.001 inches (0.0254 millimeters (mm)) and 1,000 inches (25,400 mm), between 0.01 inches (0.254 mm) and 500 inches (12,700 mm), or between 0.1 inches (2.54 mm) and 100 inches (2,540 mm).

The curved crown 208 may have an apex 214 facing the at least one roller 106. The apex 214 may be located anywhere along a height 216 of the two side walls 202. The shape of the curved crown 208 may cause the at least one roller 106 to contact the curved crown 208 along an area 210 which may be referred to as a "contact ellipse." As shown, the contact ellipse is located at a mid-section of the two side walls 202 and thus away from the outer edge 206. Inclusion of the curved crown 208 results in the contact ellipse being closer to the outer wall 200 relative to an inner ring that lacks a curved crown. The curved crown 208 thus reduces contact between the at least one roller 106 and the outer edge 206 of the two sidewalls 202, reducing wear experienced by the components of the roller bearing 100.

Although the inner ring 102 is shown as having the side walls 202, in various embodiments the outer ring 104 may include similar features as the inner ring 102 including the curved crown 208. In various embodiments, only one of the inner ring 102 or the outer ring 104 may include curved crowns, and in various embodiments, both of the inner ring 102 and the outer ring 104 may include curved crowns.

Any one or more of the inner ring 102, the outer ring 104, the at least one roller 106, and the cage 108 may include a metal alloy such as a steel. For example, one or more of these components may include a tool steel with a relatively high percentage by volume of molybdenum available as M50 Tool Steel or M50NIL Tool Steel (conforming to the AMS 6278), available from Universal Stainless of Bridgeville, Pa.; a steel with a relatively high percentage by volume of carbon and chromium available as 52100 Steel, available from Continental Steel & Tube of Fort Lauderdale, Fla.; a carburizing gear steel that resists softening at elevated service temperatures available as Pyrowear®, available from Carpenter Technology Corporation of Philadelphia, Pa.; or a stainless steel with a relatively high percentage by volume of chromium available as 440C Stainless Steel, available from Penn Stainless Products of Quakertown, Pa.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A ring for use in a roller bearing having an axis, the ring comprising:
   an outer wall;
   two side walls extending away from the outer wall, defining a cavity therebetween for receiving at least one roller, and each of the two side walls having an outer edge at a location facing the cavity and farthest from the outer wall and an inner edge at a location facing the cavity and closest to the outer wall, the outer edge being radially aligned with the inner edge such that the two side walls extend in a direction perpendicular to the outer wall; and
   a curved crown extending inward from at least one of the two side walls and configured to contact the at least one roller to reduce wear of the outer edge,
   wherein the ring is configured for use in a gas turbine engine.

2. The ring of claim 1, wherein the curved crown comprises a portion of a circle having a radius.

3. The ring of claim 2, wherein the radius is between 0.001 inches and 1,000 inches.

4. The ring of claim 1, wherein the ring is an inner ring configured to be paired with a cage, an outer ring, and the at least one roller to form the roller bearing.

5. The ring of claim 4, wherein the curved crown extends from the inner edge to the outer edge.

6. The ring of claim 1, wherein the inner ring is configured to rotate at a rotor speed of a rotor of the gas turbine engine, and the at least one roller is configured to rotate at a roller speed that is less than the rotor speed.

7. The ring of claim 1, wherein the ring comprises a steel.

8. The ring of claim 1, wherein the curved crown includes two curved crowns each extending inward from a respective one of the two side walls.

9. An inner ring for use in a roller bearing, the inner ring comprising:
   an outer wall surrounding an axis;
   two side walls extending away from the outer wall in a direction away from the axis, defining a cavity therebetween for receiving at least one roller, and each of the two side walls having an outer edge at a location facing the cavity and farthest from the outer wall and an inner edge at a location facing the cavity and closest to the outer wall, the outer edge being radially aligned with the inner edge such that the two side walls extend in a direction perpendicular to the outer wall; and
   a curved crown extending inward from at least one of the two side walls and configured to contact the at least one roller to reduce wear of the outer edge,
   wherein the inner ring is configured for use in a gas turbine engine.

10. The inner ring of claim 9, wherein the curved crown comprises a portion of a circle having a radius.

11. The inner ring of claim 10, wherein the radius is between 0.001 inches and 1,000 inches.

12. The inner ring of claim 9, wherein the inner ring is configured to be paired with a cage, an outer ring, and the at least one roller to form the roller bearing.

13. The inner ring of claim 12, wherein the inner ring is configured to rotate about the axis at a rotor speed of a rotor of the gas turbine engine, and the outer ring is configured to rotate about the axis at a second speed that is different than the rotor speed.

14. The inner ring of claim 9, wherein the inner ring is configured to rotate at a rotor speed of a rotor of the gas turbine engine, and the at least one roller is configured to rotate at a roller speed that is less than the rotor speed.

15. The inner ring of claim 9, wherein the inner ring comprises a steel.

16. The inner ring of claim 9, wherein the curved crown includes two curved crowns each extending inward from a respective one of the two side walls.

17. A roller bearing having an axis, the roller bearing comprising:
   at least one roller;
   an outer ring surrounding an axis; and
   an inner ring surrounding the axis, located radially inward from the outer ring, and comprising:
      an outer wall,
      two side walls extending away from the outer wall, defining a cavity therebetween for receiving the at least one roller, and each of the two side walls having an outer edge at a location facing the cavity and farthest from the outer wall and an inner edge at a location facing the cavity and closest to the outer wall, the outer edge being radially aligned with the inner edge such that the two side walls extend in a direction perpendicular to the outer wall, and
      a curved crown extending inward from at least one of the two side walls and configured to contact the at least one roller to reduce wear of the outer edge; and
   a cage configured to house the at least one roller between the outer ring and the inner ring,
   wherein the roller bearing is configured for us in a gas turbine engine.

18. The roller bearing of claim 17, wherein the curved crown comprises a portion of a circle having a radius between 0.001 inches and 1,000 inches.

19. The roller bearing of claim 17, wherein the inner ring is configured to rotate at a rotor speed of a rotor of the gas turbine engine, and the at least one roller is configured to rotate at a roller speed that is less than the rotor speed.

20. The roller bearing of claim 17, wherein the curved crown includes two curved crowns each extending inward from a respective one of the two side walls.

* * * * *